Patented May 13, 1952

2,596,498

UNITED STATES PATENT OFFICE 2,596,498

SUPPORTED PHOSPHORIC ACID CATALYST
AND PROCESS OF MANUFACTURE

Julian M. Mavity, Hinsdale, Ill., assignor to Universal Oil Products Company, Chicago, Ill., a corporation of Delaware No Drawing. Application October 20, 1949,
Serial No. 122,597

18 Claims. (Cl. 252—435)

This invention relates to the production of a solid catalyst useful in accelerating various types of reactions among organic compounds. In a more specific sense, the invention is concerned with the production of a particular type of solid catalyst which has special properties both in regard to its activity in accelerating and directing olefin polymerization reactions, its stability in service and in its relatively low corrosive properties when employed in ordinary commercial apparatus comprising various types of steel.

An object of this invention is a method of producing a hydrocarbon conversion catalyst having high catalytic activity.

Another object of this invention is a highly active catalyst suitable for use in the polymerization of olefinic hydrocarbons and in other hydrocarbon conversion reactions involving olefins.

One specific embodiment of this invention relates to a process for improving the thermal stability of a calcined composite of an acid of phosphorus and a carrier which comprises treating said composite with an organo-metallic compound of a metal of group II of the periodic table.

Another embodiment of this invention relates to a process for improving the thermal stability of a calcined composite of a polyphosphoric acid and a siliceous adsorbent which comprises treating said composite with an organi-metallic compound of a metal of group II of the periodic table.

A further embodiment of this invention relates to a process for improving the thermal stability of a calcined composite of a polyphosphoric acid and diatomaceous earth which comprises treating said composite with ethyl magnesium bromide.

The essential and active ingredient of the solid catalysts which are manufactured by the present process for use in organic reactions is an acid of phosphorus, preferably one in which the phosphorus has a valence of 5. The acid may constitute 60% to about 75% or more of the catalyst mixture ultimately produced, and in most cases is over 50% by weight thereof. Of the various acids of phosphorus, orthophosphoric acid ($H_3PO_4$) and pyrophosphoric acid ($H_4P_2O_7$) find general application in the primary mixtures, due mainly to their cheapness and to the readiness with which they may be procured although the invention is not restricted to their use but may employ any of the other acids of phosphorus insofar as they are adaptable. It is not intended to infer, however, that the different acids of phosphorus, which may be employed will produce catalysts which have identical effects upon any given organic reaction as each of the catalysts produced from different acids and by slightly varied procedures will exert its own characteristic action.

When orthophosphoric acid is used as a primary ingredient, different concentrations of the aqueous solution may be employed from approximately 75 to 100% or acid containing some free phosphorus pentoxide may even be used. By this is meant that the ortho acid may contain a definite percentage of the pyro acid corresponding to the primary phase of dehydration of the orthophosphoric acid. Within these concentration ranges, the acids will be liquids of varying viscosities, and readily mixed with adsorbent materials. In practice it has been found that pyrophosphoric acid corresponding to the formula $H_4P_2O_7$ can be incorporated with siliceous adsorbents at temperatures somewhat above its melting point (142° F.) and that the period of heating which is given to the pyro acid-adsorbent mixtures or to mixtures of other polyphosphoric acids and siliceous adsorbents may be different from that used when the ortho acid is so employed.

Triphosphoric acid which may be represented by the formula $H_5P_3O_{10}$ may also be used as starting material for preparation of the catalysts of this invention. These catalytic compositions may also be prepared from the siliceous materials mentioned herein and a phosphoric acid mixture containing orthophosphoric, pyrophosphoric, triphosphoric, and other polyphosphoric acids.

Another acid of phosphorus which may be employed in the manufacture of composite catalysts according to the present invention is tetraphosphoric acid. It has the general formula $H_6P_4O_{13}$ which corresponds to the double oxide formula $2H_2O.2P_2O_5$ which in turn may be considered as the acid resulting when three molecules of water are lost by four molecules of orthophosphoric acid $H_3PO_4$. The tetraphosphoric acid may be manufatcured by the gradual and controlled dehydration by heating of orthophosphoric acid or pyrophosphoric acid or by adding phosphorus pentoxide to these acids in proper amounts. When the latter procedure is followed, phosphoric anhydride is added gradually until it amounts to 520% by weight of the total water present. After a considerable period of standing at ordinary temperatures, the crystals of the tetraphosphoric acid separate from the viscous liquid and it is found that these crystals melt at approximately 93° F. and have a specific gravity of 1.1886 at a temperature of 60° F. However, it is unnecessary to crystallize the tetraphosphoric acid before employing it in the preparation of the solid catalysts inasmuch as the crude tetraphosphoric acid mixture may be incorporated with the siliceous adsorbent and other catalyst ingredient.

The materials which may be employed as adsorbents or carriers for acids of phosphorus include siliceous adsorbents such as diatomaceous earth, kieselguhr, artificially prepared silica, and also certain aluminum silicates which include naturally occurring substances as various fuller's earths, clays, such as bentonite, montmorillonite, acid treated clays, also refractory oxides, carbon, and similar materials. Each adsorbent or supporting material which may be used will exert its own specific influence upon the final catalyst composite formed in the process.

Organo metallic compounds of a metal of group II of the periodic table which are used for treating a calcined composite of a phosphoric acid and a carrier to improve its thermal stability and increase the active life of the catalyst include particularly compounds of magnesium and/or zinc. These compounds comprise alkyl magnesium halides and aryl magnesium halides which are commonly referred to as Grignard reagents, as well as zinc alkyls, such as zinc diethyl, etc. In order to add these materials to calcined composite of phosphoric acid and a carrier, these organo metallic compounds are usually employed in solution in a non-basic organic solvent, preferably a volatile ether, or a low boiling hydrocarbon, having suitable solvent properties. It is usually desirable to control rather carefully the quantity of the organo metallic compound which goes into the final catalyst in order to avoid deactivation through neutralization of such a large proportion of the phosphoric acid.

The treatment of a calcined composite of a phosphoric acid and a carrier with an organo metallic compound of a group II metal may be carried out by one of the following methods:

(1) The calcined composite may be maintained at a temperature of from about 100° to about 550° C. and contacted with the organo metallic compound or (2) The calcined composite of phosphoric acid and a carrier may be treated with a solution of the organo metallic compound dissolved in a suitable solvent such as a low boiling saturated hydrocarbon, an ether, or another relatively low boiling organic solvent free from hydroxyl groups.

During this treatment of a calcined composite of a phosphoric acid and a carrier, with an organo metallic compound of group II such as ethyl magnesium bromide, the amount of said organo metallic compound is controlled so that the resultant treated phosphoric acid containing catalyst will contain from about 1 to about 10% by weight of a phosphate of a group II metal so added in the form of an organo metallic compound which reacts readily with a part of the free phosphoric acid content of the solid catalyst forming a group II metal phosphate and thus increasing the structural strength of the treated catalytic material.

Composites of a phosphoric acid and a carrier are prepared by mixing the phosphoric acid with the finely divided relatively inert carrier generally at a temperature of from about 20° to about 250° C. to form an aggregate in which the phosphoric acid is ordinarily the major proportion by weight. The resultant aggregate is a slightly moist to almost dry material which upon being compressed becomes sufficiently plastic that it can be extruded and formed into shaped particles. The resultant particles are then dried and calcined at a temperature of from about 100° to about 550° C. for a time of from about 0.25 to about 10 hours to form a substantially solid material. The calcining operation may be carried out by heating the formed particles in a substantially inert gas such as air, nitrogen, flue gas and the like. These calcined particles are then composited with an organo metallic compound of a metal of group II of the periodic table, as herein set forth.

A calcined composite of an acid of phosphorus and a carrier, particularly a siliceous carrier such as diatomaceous earth, is treated with ethyl magnesium bromide or with a mixture of ethyl magnesium bromide and diethyl ether. Thus, the particles of the calcined composite may be mixed with or soaked in ethyl magnesium bromide, the treated composite may then be separated from the excess of the treating material or solvent after which the catalyst particles which are wetted with the ethyl magnesium bromide are heated in an inert atmosphere to form a solid catalytic material with greater thermal stability and longer life than those of the calcined composite of a phosphoric acid and a carrier which was subjected to this treating step.

Calcined composites of a phosphoric acid and a carrier particularly a siliceous carrier which are treated as herein set forth, as with ethyl magnesium bromide, are active for promoting polymerization of olefinic hydrocarbons, particularly for promoting polymerization of normally gaseous olefinic hydrocarbons to form normally liquid hydrocarbons suitable for use as constituents of gasoline. When employed in the conversion of olefinic hydrocarbons into polymers, the calcined catalyst formed as herein set forth is preferably employed as a granular layer in a heated reactor, which is generally made from steel, and through which the preheated hydrocarbon fraction is directed. Thus the solid catalyst of this process may be employed for treating mixtures of olefin-containing hydrocarbon vapors to effect olefin polymerization, but this same catalyst may also be used at operating conditions suitable for maintaining liquid phase operation during polymerization of olefinic hydrocarbons, such as butylenes, to produce gasoline fractions. Thus when employed in the polymerization of normally gaseous olefins, the formed and calcined catalyst particles are generally placed in a vertical, cylindrical treating tower and the olefin-containing gas mixture is passed downwardly therethrough at a temperature of from about 350° to about 550° F. and at a pressure of 100 to about 1500 pounds per square inch when dealing with olefin-containing materials such as stabilizer reflux which may contain from approximately 10 to 50% or more of propylene and butylene. When operating on a mixture comprising essentially butanes and butylenes, this catalyst is effective at conditions favoring the maximum utilization of both normal butylenes and isobutylene which involves mixed polymerization at temperatures of from approximately 250° to about 325° F. and at pressures of from about 500 to about 1500 pounds per square inch.

When the catalysts of this invention are utilized for promoting miscellaneous organic reactions, the catalysts may be employed in essentially the same way as they are used when polymerizing olefins, in case the reactions are essentially vapor phase, and they may be employed also in suspension in liquid phase in various types of equipment.

With suitable modifications in the details of operation, the present type of catalyst may be employed in a large number of organic reactions including polymerization of olefins as already mentioned. Typical cases of reaction in which the present type of catalyst may be used are the alkylation of cyclic compounds with olefins, the cyclic compounds including aromatics, polycyclic compounds, naphthenes, and phenols; condensation reactions such as those occurring between ethers and aromatics, alcohols and aromatics, phenols and aldehydes, etc.; reactions involving the hydro-halogenation of unsaturated organic compounds, isomerization reactions, ester formation carried out by the interaction of carboxylic acids and olefins, and the like. The specific procedure for utilizing the present type of catalysts in miscellaneous organic reactions will be determined by the chemical and physical characteristics and the phase of the reacting constituents.

During use of these catalysts in vapor phase polymerizations, and other phase treatments of organic compounds, it is often advisable to add small amounts of moisture to prevent excessive dehydration and subsequent decrease in catalyst activities. In order to substantially prevent loss of water from the catalyst an amount of water or water vapor such as steam is added to the charged olefin-containing gas so as to substantially balance the vapor pressure of the catalyst. This amount of water vapor varies from about 0.1 to about 6% by volume of the organic material charged.

Solid prosphoric acid catalysts which have been prepared heretofore by calcining composites of a siliceous adsorbent and a phosphoric acid frequently lose their activities during polymerization use and also suffer a marked decrease in crushing strength due to the softening of the catalyst. Such softening of the catalyst also results in short catalyst life inasmuch as the catalyst towers become plugged during use. In this process, I have found that catalysts of high thermal stability and long life may be produced by adding ethyl magnesium bromide to a composite of polyphosphoric acid and diatomaceous earth in which an amount of from about 1 to about 10% by weight (based upon the weight of total catalyst) of magnesium phosphate may be formed in the final catalyst composite. Such a catalyst composite which has been treated with ethyl magnesium bromide also has a good crushing strength after it has been calcined at the relatively high temperature of 860° F. and also has a high activity for promoting polymerization of propylene into normally liquid hydrocarbons, boiling within the range of gasoline.

The following example illustrates the preparation of catalysts comprised within the scope of this invention and gives results obtained in their use for catalyzing the polymerization of propylene, although the exact details set forth herein are not to be construed as imposing undue limitations upon the generally broad scope of the invention.

Table I shows comparative results obtained in autoclave polymerization tests on catalysts prepared from phosphoric acid and diatomaceous earth which had been treated with ethyl magnesium bromide by the method described herein. These catalyst activity tests were carried out by placing 10 grams of 5 x 5 mm. pellets of catalyst and 100 grams of a propane propylene mixture (50-55% propylene content) in a rotatable steel autoclave of 850 cc. capacity which was then rotated at a temperature of 450° F. for two hours. At the end of this time, determinations were made to indicate the percentage conversion of propylene into liquid polymers.

TABLE I

*Propylene polymerizing activities and crushing strengths of catalysts formed by treating a calcined composite of polyphosphoric acid and diatomaceous earth with ethyl magnesium bromide*

[Test conditions: 10 grams catalyst pellets, 100 grams propane-propylene mixtures containing 53.3% propylene maintained for two hours at a temperature of 230° C. in a rotating autoclave of 850 cc. capacity.]

| Run No. | Materials added to calcined composite of polyphosphoric acid and diatomaceous earth | Calcination | | Percent Conv. Propylene | Crushing strength, lbs. | |
|---|---|---|---|---|---|---|
| | | °C. | Hours | | Before Use | After Use |
| 1 | Ethyl magnesium bromide | 680 | 1 | 47.6 | 14.2 | 8.5 |
| 2 | do | 860 | 1 | 57.4 | 14.5 | 14.6 |
| 3 | do | 680 | 1 | 55.6 | 12.5 | 8.5 |
| 4 | do | 860 | 1 | 64.0 | 13.1 | 7.4 |
| 5 | None | 680 | 1 | 66.5 | 11.4 | 5.4 |
| 6 | do | 860 | 1 | 48.5 | 16.0 | 9.1 |

In runs 1 and 2, the magnesium used was 0.7% by weight of the original composite and in runs 3 and 4 it was 1.4% by weight of the composite.

From the results given in Table I it is noted that the treatment of solid phosphoric acid catalyst with ethyl magnesium bromide resulted in the formation of a calcined composite of high thermal stability and good crushing strength. Thus catalysts used in runs 2 and 4, were superior in activity to that used in run 6, the latter being the original composite of polyphosphoric acid and diatomaceous earth calcined further for one hour at a temperature of 860° F. The catalysts of runs 2 and 4 which had been treated further with ethyl magnesium bromide (magnesium equal to 0.7 and 1.4 weight per cent of the original catalyst, respectively) had propylene polymerizing activities of 57 and 64% in comparison with 48% for the original catalyst before treating with the organo magnesium compound.

I claim as my invention:

1. A process for improving the thermal stability of a calcined composite of a phosphoric acid and a solid supporting material which comprises treating said composite with an organo compound of a metal selected from the group consisting of magnesium and zinc, said compound being reactable with free phosphoric acid in said composite and being in an amount sufficient to add from about 1% to about 10% by weight of a phosphate of said metal to the composite, and calcining the thus treated composite.

2. A process for improving the thermal stability of a calcined composite of a polyphosphoric acid and a siliceous adsorbent which comprises treating said composite with an organo compound of a metal selected from the group consisting of magnesium and zinc, said compound being reactable with free phosphoric acid in said composite and being in an amount sufficient to add from about 1% to about 10% by weight of a phosphate of said metal to the composite, and calcining the thus treated composite.

3. A solid catalytic material formed by treating a precalcined composite of a phosphoric acid and a solid supporting material with an organo compound of a metal selected from the group consisting of magnesium and zinc, said compound being reactable with free phosphoric acid in said composite and being in an amount sufficient to add from about 1% to about 10% by weight of a phosphate of said metal to the composite, and calcining the thus treated composite.

4. A process for improving the thermal stability of a calcined composite of an acid of phosphorus and a solid supporting material which comprises treating said composite with an organo compound of a metal selected from the group consisting of magnesium and zinc in an amount sufficient to add from about 1 to about 10% by weight of a metal phosphate to said calcined composite and further calcining the resultant composite at a temperature of from about 100° to about 550° C. to form a solid catalytic material.

5. A process for improving the thermal stability of a calcined composite of a polyphosphoric acid and a siliceous adsorbent which comprises treating said composite with an organo compound of a metal selected from the group consisting of magnesium and zinc in an amount sufficient to add from about 1 to about 10% by weight of a metal phosphate to said calcined composite and further calcining the resultant composite at a temperature of from about 100° to about 550° C. to form a solid catalytic material.

6. A process for improving the thermal stability of a calcined composite of a polyphosphoric acid and diatomaceous earth which comprises treating said composite with an organo compound of a metal selected from the group consisting of magnesium and zinc in an amount sufficient to add from about 1 to about 10% by weight of a metal phosphate to said calcined composite and further calcining the resultant composite at a temperature of from about 100° to about 550° C. to form a solid catalytic material.

7. A process for improving the thermal stability of a calcined composite of an acid of phosphorus and a solid supporting material which comprises treating said composite with an organo compound of a metal selected from the group consisting of magnesium and zinc in an amount sufficient to add from about 1 to about 10% by weight of a metal phosphate to said calcined composite and further calcining the resultant composite at a temperature of from about 100° to about 550° C. for a time of from about 0.25 to about 10 hours to form a solid catalytic material.

8. A process for improving the thermal stability of a calcined composite of a polyphosphoric acid and siliceous carrier which comprises treating said composite with an amount of ethyl magnesium bromide sufficient to add from about 1% to about 10% by weight of a magnesium phosphate to said composite, and calcining the thus treated composite.

9. A process for improving the thermal stability of a calcined composite of pyrophosphoric acid and siliceous carrier which comprises treating said composite with an amount of ethyl magnesium bromide sufficient to add from about 1% to about 10% by weight of a magnesium phosphate to said composite, and calcining the thus treated composite.

10. A process for improving the thermal stability of a calcined composite of a polyphosphoric acid and diatomaceous earth which comprises treating said composite with an amount of ethyl magnesium bromide sufficient to add from about 1 to about 10% by weight of a magnesium phosphate to said calcined composite, and further calcining the resultant composite at a temperature of from about 100° to about 550° C. to form a solid catalytic material.

11. A process for improving the thermal stability if a calcined composite of a polyphosphoric acid and siliceous carrier which comprises treating said composite with an amount of ethyl magnesium bromide sufficient to add from about 1 to about 10% by weight of a magnesium phosphate to said calcined composite, and further calcining the resultant composite at a temperature of from about 100° to about 550° C. for a time of from about 0.25 to about 10 hours to form a solid catalytic material.

12. A process for improving the thermal stability of a calcined composite of a polyphosphoric acid and siliceous carrier which comprises treating said composite with a short-chain zinc alkyl in sufficient amount to add from about 1% to about 10% by weight of a zinc phosphate to said composite, and calcining the thus treated composite.

13. A process for improving the thermal stability of a calcined composite of pyrophosphoric acid and diatomaceous earth which comprises treating said composite with a short-chain zinc alkyl in sufficient amount to add from about 1% to about 10% by weight of a zinc phosphate to said composite, and calcining the thus treated composite.

14. A process for improving the thermal stability of a calcined composite of a polyphosphoric acid and siliceous carrier which comprises treating said composite with an amount of a short-chain zinc alkyl sufficient to add from about 1 to about 10% by weight of a zinc phosphate to said calcined composite, and further calcining the resultant composite at a temperature of from about 100° to about 550° C. to form a solid catalytic material.

15. A process for improving the thermal stability of a calcined composite of a polyphosphoric acid and diatomaceous earth which comprises treating said composite with an amount of a short-chain zinc alkyl sufficient to add from about 1 to about 10% by weight of a zinc phosphate to said calcined composite, and further calcining the resultant composite at a temperature of from about 100° to about 550° C. for a time of from about 0.25 to about 10 hours to form a solid catalytic material.

16. A solid catalytic material formed by treating a precalcined composite of a polyphosphoric acid and a siliceous carrier with an organo compound of a metal selected from the group consisting of magnesium and zinc in an amount sufficient to add from about 1% to about 10% by weight of a phosphate of said metal to the composite and calcining the resultant material at a temperature of from about 100° to about 550° C. for a time of from about 0.25 to about 10 hours.

17. A solid catalytic material formed by treating a precalcined composite of a polyphosphoric acid and a siliceous carrier with an amount of ethyl magnesium bromide sufficient to add from about 1 to about 10% by weight of a magnesium phosphate to said precalcined composite, and further calcining the resultant composite at a temperature of from about 100° to about 550° C. for a time of from about 0.25 to about 10 hours.

18. A solid catalytic material formed by treating a precalcined composite of a polyphosphoric acid and a siliceous carrier with an amount of a short-chain zinc alkyl sufficient to add from about 1 to about 10% by weight of a zinc phosphate to said precalcined composite, and further calcining the resultant composite at a temperature of from about 100° to about 550° C. for a time of from about 0.25 to about 10 hours.

JULIAN M. MAVITY.

REFERENCES CITED

The following references are of record in the file of this patent:

UNITED STATES PATENTS

| Number | Name | Date |
| --- | --- | --- |
| 2,251,580 | Ruthruff | Aug. 5, 1941 |
| 2,496,621 | Deery | Feb. 7, 1950 |